United States Patent
Nakamura et al.

(10) Patent No.: US 10,700,511 B2
(45) Date of Patent: Jun. 30, 2020

(54) PROTECTOR FOR ELECTRICITY SUPPLY CIRCUIT

(71) Applicant: Yazaki Corporation, Minato-ku, Tokyo (JP)

(72) Inventors: Yoshihide Nakamura, Shizuoka (JP); Akinori Maruyama, Shizuoka (JP); Keisuke Ueta, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 452 days.

(21) Appl. No.: 14/513,346

(22) Filed: Oct. 14, 2014

(65) Prior Publication Data

US 2015/0029629 A1 Jan. 29, 2015

Related U.S. Application Data

(63) Continuation of application No. PCT/JP2013/054123, filed on Feb. 20, 2013.

(30) Foreign Application Priority Data

Apr. 24, 2012 (JP) .................................. 2012-098909

(51) Int. Cl.
  *H02H 5/04* (2006.01)
  *H02H 6/00* (2006.01)
  (Continued)

(52) U.S. Cl.
  CPC .............. *H02H 5/04* (2013.01); *H02H 3/085* (2013.01); *H02H 5/041* (2013.01); *H02H 6/00* (2013.01); *G06F 1/26* (2013.01); *H02H 7/226* (2013.01)

(58) Field of Classification Search
  CPC ............ H02H 3/08; H02H 3/085; H02H 5/04; H02H 5/041; H02H 3/093; H02H 5/047; H02H 6/00
  See application file for complete search history.

(56) References Cited

U.S. PATENT DOCUMENTS

| 5,418,677 A | 5/1995 | Engel | |
|---|---|---|---|
| 2007/0103820 A1* | 5/2007 | Kobayashi | H02P 29/00 361/25 |
| 2012/0022708 A1* | 1/2012 | Higuchi | H02J 7/0031 700/293 |

FOREIGN PATENT DOCUMENTS

| JP | 2007151380 A | 6/2007 |
|---|---|---|
| JP | 2010-239835 A | 10/2010 |

(Continued)

OTHER PUBLICATIONS

Communication dated Dec. 18, 2015 from the European Patent Office issued in corresponding Application No. 13781453.9.

(Continued)

*Primary Examiner* — Thienvu V Tran
*Assistant Examiner* — Christopher J Clark
(74) *Attorney, Agent, or Firm* — Sughrue Mion, PLLC

(57) ABSTRACT

A protector for an electricity supply circuit includes: a power switch for switching between connection and disconnection of the electricity supply circuit; a controller configured to output a switching command signal to the power switch in accordance with an input signal; and a current detector for detecting current flowing to the electricity supply circuit. The controller includes: a lower limit threshold determination unit configured to determine whether or not an estimated temperature of a power line has dropped below a lower limit threshold; a timer for counting the time that passes after a load has been turned off, when the load is turned off by the power switch; and a mode switching unit configured to switch the controller to a sleep mode when a predetermined time is counted by the timer and the lower limit threshold determination unit determines that the estimated temperature has dropped below the lower limit threshold.

3 Claims, 3 Drawing Sheets

(51) Int. Cl.
*H02H 3/08* (2006.01)
*H02H 7/22* (2006.01)
*G06F 1/26* (2006.01)

(56) References Cited

FOREIGN PATENT DOCUMENTS

| | | |
|---|---|---|
| JP | 2011148484 A | 8/2011 |
| JP | 2011-229319 A | 11/2011 |

OTHER PUBLICATIONS

Communication dated Nov. 24, 2015 from the Japanese Patent Office issued in counterpart Japanese application No. 2012-098909.
Communication dated May 31, 2016 from the Japanese Patent Office in counterpart application No. 2012-098909.
Communication dated Feb. 21, 2017, from the Japanese Patent Office in counterpart application No. 2012-098909.
Communication dated Aug. 8, 2017, from the Japanese Patent Office in counterpart application No. 2012-98909.
Communication dated Nov. 29, 2016, from the Japanese Patent Office in counterpart application No. 2012-098909.

* cited by examiner

PROTECTOR FOR ELECTRICITY SUPPLY CIRCUIT

CROSS REFERENCE TO RELATED APPLICATIONS

This application is a continuation of International Application No. PCT/JP2013/054123, filed Feb. 20, 2013, and based upon and claims the benefit of priority from Japanese Patent Application No. 2012-098909, filed Apr. 24, 2012, the entire contents of all of which are incorporated herein by reference.

TECHNICAL FIELD

The present invention relates to a protector for an electricity supply circuit for supplying electricity to a load installed on a vehicle, which immediately disconnects the circuit when an overcurrent flows to the electricity supply circuit and temperature rises in the circuit, for protecting the electricity supply circuit and the load.

BACKGROUND ART

A controller for controlling a load installed on a vehicle is equipped with a protector that immediately disconnects a circuit when an overcurrent flows to the load. As a conventional example of such a protector, there is known a protector described in JP 2010-239835 A (PTL 1). In PTL 1, the quantities of heat generation and heat radiation of an electricity supply circuit (including a power line connecting a load with a power supply, and a power switch) are calculated on the basis of a current flowing to the load and furthermore, the temperature of the electricity supply circuit is estimated on measurement of the ambient temperature. Then, if an estimated temperature reaches a predetermined threshold value, the controller disconnects the electricity supply circuit to protect a circuit connected to the load.

If the estimated temperature of the electricity supply circuit meets a predetermined temperature condition (for example, a situation where the temperature drops to the ambient temperature), the operation of the controller is switched to a sleep mode (low power consumption mode) and thereby to reduce power consumption. For the reason that current does not flow to the electricity supply circuit connected to the load in a situation where the load is inactivated, the computing load of the controller is reduced by stopping the operation of estimating the temperature of the electricity supply circuit, reducing the power consumption as a whole.

SUMMARY OF INVENTION

In the conventional example disclosed in PTL 1, there is adopted a method for calculating the quantities of heat generation and heat radiation of the electricity supply circuit based on the current flowing to the load, and thereby to estimate the temperature of the electricity supply circuit on the ground of the calculation result. Therefore, for example, just after an ignition of the vehicle is turned off and if the temperature of the electricity supply circuit rises due to environmental heat, it will be impossible to estimate the temperature correctly. Immediately after the ignition of the vehicle was turned off, especially, high-temperature air is accumulated inside an engine room because of stopping forced air cooling around the engine of the vehicle. Impacted by this circumstance, there is a possibility that the temperature of the electricity supply circuit is raised despite that no current flows to the load. In other words, the actual temperature of the electricity supply circuit may become higher than temperature obtained by the above estimation process.

In such a case, if the operation of the controller is switched to the sleep mode since the estimated temperature drops to the ambient temperature, there is caused a situation where the controller is operated in the sleep mode despite that the temperature has not dropped to the ambient temperature actually. For this reason, when the load is subsequently activated so that current flows to the electricity supply circuit, the temperature estimation with high accuracy will be no longer available.

In order to solve the above-mentioned problem, therefore, the present invention is intended to provide a protector for an electricity supply circuit, which is capable of switching the operation of a controller that controls driving and stop of a load, to a low power-consumption mode properly.

In order to attain the above object, according to a first aspect of the present invention, there is provided a protector for an electricity supply circuit, which is installed on a vehicle to monitor a temperature of the electricity supply circuit connected to a load and which disconnects the electricity supply circuit when the temperature of the electricity supply circuit exceeds a preset threshold temperature, and thereby to protect the electricity supply circuit, the protector including: a power switch configured to switch between connection and disconnection of the electricity supply circuit; a controller configured to output a switching command signal to the power switch in accordance with an input signal; and a current detector for detecting current flowing to the electricity supply circuit. The controller includes: a temperature estimation unit configured to estimate rising temperature of the electricity supply circuit based on a current detected by the current detector and conducting time when the electricity supply circuit is turned on, estimates lowering temperature of the electricity supply circuit based on elapsed time when the electricity supply circuit is turned off by the controller, and estimates temperature of the electricity supply circuit based on the rising temperature and the lowering temperature; a timer for counting elapsed time that passes after the load has been turned off when the load is turned off by the power switch; a lower limit threshold determination unit configured to determine whether or not the estimated temperature of a power line estimated by the temperature estimation unit has dropped below a predetermined temperature determined by ambient temperature of the electricity supply circuit; and a mode switching unit configured to switch the controller to a low power consumption mode where the power consumption is smaller than that in a normal operation mode when a predetermined time is counted by the timer and the lower limit threshold determination unit determines that the estimated temperature of the power line estimated by the temperature estimation unit has dropped below the predetermined temperature.

Preferably, the temperature estimation unit does not estimate the temperature of the electricity supply circuit when the operation is switched to the low power consumption mode by the mode switching unit.

In the protector for the electricity supply circuit according to the first aspect of the present invention, when the load is turned off by the power switch, it is started to count the time by the timer. Subsequently, when the predetermined time is counted by the timer and the lower limit threshold determination unit determines that the estimated temperature of the power line estimated by the temperature estimation unit has dropped below the prescribed temperature, the operation of the controller is switched to the low power consumption mode. Therefore, even when the estimated temperature of the power line is raised by environmental temperature, it is possible to prevent the operation from being switched to the low power consumption mode before the temperature of the power line drops to the environmental temperature and also possible to detect the estimated temperature of the power line appropriately.

DESCRIPTION OF EMBODIMENT

Figure 1:
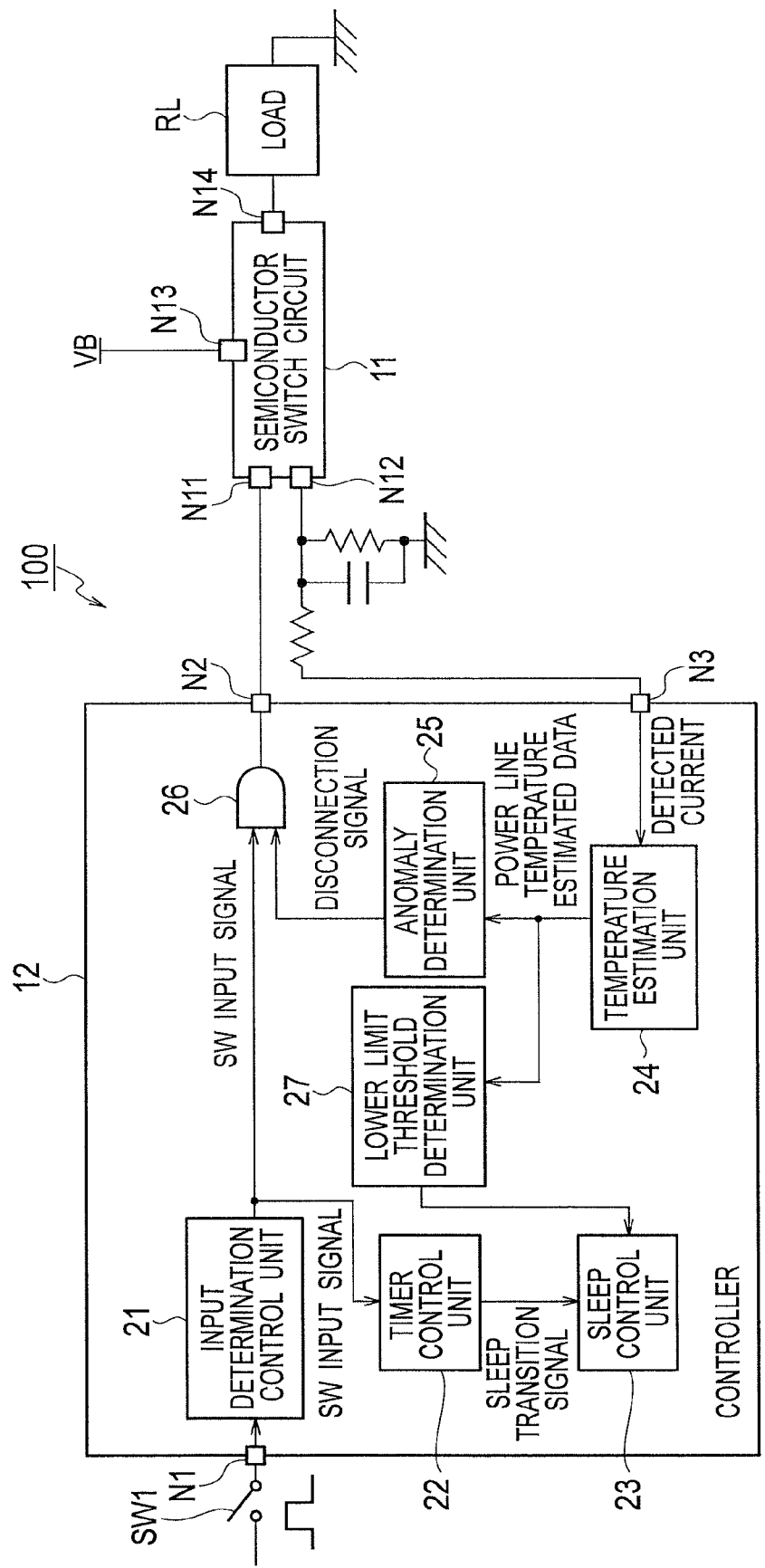
FIG. 1 is a block diagram illustrating the constitution of a load drive apparatus equipped with a protector for an electricity supply circuit according to an embodiment.

An embodiment of the present invention will be described with reference to drawings. As illustrated in FIG. 1, a load driving apparatus 100, which is equipped with a protector for an electricity supply circuit according to the embodiment of the present invention, includes a load RL, such as a motor and a lamp mounted on a vehicle, a semiconductor switch circuit 11 as a power switch that switches between driving of the load RL and its operational stop, and a controller 12 configured to control the semiconductor switch circuit 11.

The semiconductor switch circuit 11 is arranged between a power supply VB and the load RL to switch between driving and operational stop of the load in response to an operation command signal outputted from the controller 12. The semiconductor switch circuit 11 has a function as a current detector for detecting current flowing to the load RL. Specifically, when the operation command signal is inputted to a terminal N11, the semiconductor switch circuit 11 turns on the power switch to make electrical conduction between terminals N13 and N14, supplying the load RL with current for its driving. Additionally, the semiconductor switch circuit 11 outputs a current detection signal from a terminal N12. The semiconductor switch circuit 11 may be comprised of, for example, IPS (Intelligent Power Switch) or a combination of MOSFET and a shunt resistor.

The controller 12 includes an input determination control unit 21, a timer control unit 22, a sleep control unit 23, a temperature estimation unit 24, an anomaly determination unit 25, a lower limit threshold determination unit 27, an AND circuit 26, and terminals N1, N2 and N3 for connection with external equipment. The controller 12 may be formed by an integrated computer consisting of, for example, a central processing unit (CPU) and storage units, such as RAM, ROM, and hard disc.

The input determination control unit 21 is connected to an operation switch SW1 through the terminal N1. When inputting an ON command or an OFF command by the operation switch SW1, the input determination control unit 21 outputs a switch input signal based on these commands to the AND circuits 26 and the timer control unit 22.

The timer control unit 22 has a timer for counting time and activates the timer when the switch input signal representing the OFF command is outputted from the input determination control unit 21.

When a predetermined time is counted by the timer, and additionally the lower limit threshold determination unit 27 judges that temperature of a power line has dropped below a lower limit threshold, the sleep control unit 23 is configured to control switching the operation of whole of the controller 12 from a normal mode, which is a mode during normal operation, to a sleep mode (low power-consumption mode) whose power consumption is smaller than that in the normal mode. While, when the input determination control unit 21 inputs the switch input signal representing the ON command, the sleep control unit 23 is configured to control transferring to the normal mode upon canceling the sleep mode. Thus, the sleep control unit 23 serves as a mode switching unit for switching the operation mode of the controller 12.

The temperature estimation unit 24 is connected to the terminal N3. The terminal N3 is connected to the terminal N12 of the semiconductor switch circuit 11 via a resistor. The temperature estimation unit 24 acquires a current detection signal flowing to the semiconductor switch circuit 11, calculates the quantities of heat generation and heat radiation of a power line constituting the electricity supply circuit, based on current flowing to the semiconductor switch circuit 11 and further estimates temperature of the power line constituting the electricity supply circuit, based on the characteristics of the electricity supply circuit, such as thermal resistance and heat capacity. Note, a method of estimating the temperature of the power line by the temperature estimation unit 24 will be described later.

Based on the power line temperature estimated by the temperature estimation unit 24, the anomaly determination unit 25 outputs a disconnection signal to the AND circuit 26 when the power line temperature reaches a preset threshold temperature. Specifically, the anomaly determination unit 25 outputs a signal at "L" level to the AND circuit 26.

One input terminal of the AND circuit 26 is connected to an output terminal of the input determination control unit 21, and the other input terminal of the AND circuit 26 is connected to an output terminal of the anomaly determination unit 25. When both the output signal of the input determination control unit 21 and the output signal of the anomaly determination unit 25 are signals at "H" level together, the AND circuit 26 outputs a signal at the "H" level through the terminal N2. When the output signal of the AND circuit 26 becomes the "H" level, the semiconductor switch circuit 11 is turned on, so that the load RL is supplied with the electricity.

The lower limit threshold determination unit 27 is configured to process judging whether or not the temperature of the power line estimated by the temperature estimation unit 24 has dropped below a predetermined lower limit threshold (for example, temperature that is established so as to be somewhat higher than an ambient temperature).

[Description of Estimation Process of Power Line Temperature]

Next, the process of estimating the temperature of the power line by the temperature estimation unit 24 will be described. First, the calculation of rising temperature is explained. The quantity of heat X1 [J] of power line accompanied with heat generation caused by current flowing to the power line connected to the load RL can be represented by following equation (1).

$$X1 = i^2 \times R_{on} \times \Delta t \quad (1)$$

where, i is current [A], $R_{on}$ is resistance of a conductor [Ω], and $\Delta t$ is a sampling time [sec].

Therefore, the present estimated temperature T1 of the power line [° C.] can be obtained by adding temperature, which is obtained by dividing the quantity of heat X1 [J] by heat capacity [J/° C.], to temperature [° C.] at a previous detection (initially, ambient temperature).

Next, the calculation of lowering temperature will be described. The quantity of heat radiation Y1 [J] accompanied with heat radiation under condition that no current is detected by the semiconductor switch circuit 11 can be represented by following equation (2).

$$Y1=Q/(C_{th} \times R_{th}/\Delta t) \qquad (2)$$

where, Q is heat quantity of the power line [J], $C_{th}$ is heat capacity of the power line [J/° C.], $R_{th}$ is thermal resistance of the power line [° C./W], and $\Delta t$ is a sampling time [sec]. Then, the current estimated temperature of the power line T1 [° C.] can be obtained by subtracting temperature, which is obtained by dividing the quantity of heat radiation Y1 [J] by the heat capacity [J/° C.] from temperature [° C.] at a previous detection.

[Explanation about Normal Operation]

Next, the operation of the protector for the electricity supply circuit according to the embodiment at the normal operation will be described. When the operation switch SW is turned on and an ON command signal is inputted to the controller 12 through the terminal N1, the ON command signal is supplied, as a switch input signal representing the ON command, to one input terminal of the AND circuit 26 by the input determination control unit 21. Further, during the normal operation, the anomaly determination unit 25 does not output a temperature anomaly signal but outputs a signal at the "H" level. Thus, an output signal from the AND circuit 26 becomes the "H" level, so that a signal at the level of "H" is outputted from the terminal N2. Then, this "H" level signal is supplied to the terminal N11 of the semiconductor switch circuit 11.

Consequently, the semiconductor switch circuit 11 activates the power switch and supplies the load RL with electricity from the power supply VB. As a result, it becomes possible to drive the load RL. The temperature estimation unit 24 calculates the estimated temperature T1 of the power line constituting the electricity supply circuit based on the above-mentioned equations (1) and (2). When the estimated temperature T1 of the power line reaches a predetermined threshold value, then the anomaly determination unit 25 outputs a disconnection signal. That is, the anomaly determination unit 25 switches the output signal from the "H" level to the "L" level. As a result, the output signal of the AND circuit 26 is altered from the "H" level to the "L" level, so that the semiconductor switch circuit 11 inactivates the power switch to stop supplying the electricity to the load RL.

In this way, the controller 12 allows the temperature estimating unit 24 to estimate the estimated temperature T1 of the power line at a predetermined sampling period and also operates to disconnect the semiconductor switch circuit 11 when the estimated temperature T1 of the power line exceeds the threshold value, and thereby to stop supplying the electricity to the load RD, then protecting whole of the circuit.

[Explanation about Transitional Operation to Sleep Mode]

Figure 2:
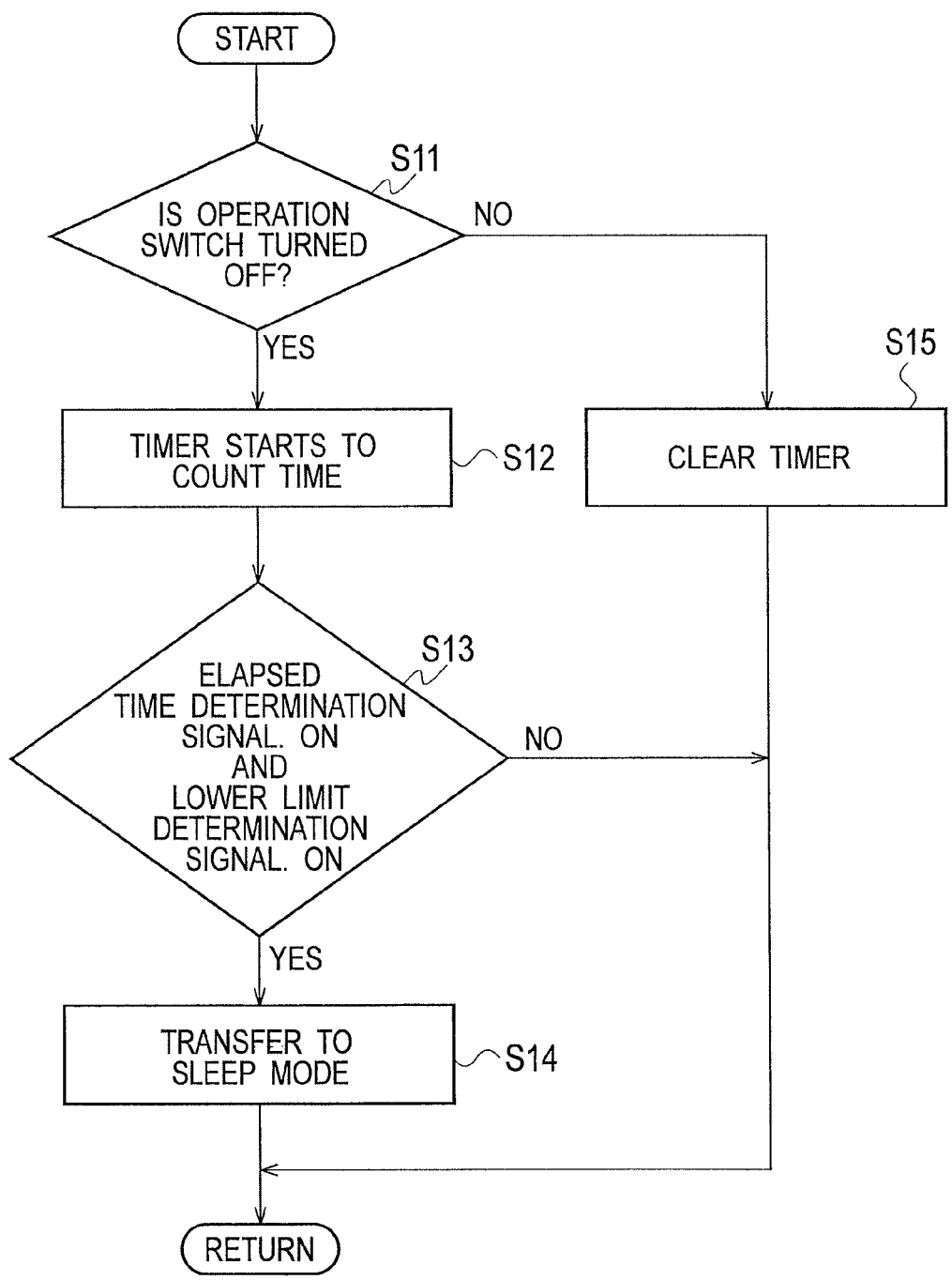
FIG. 2 is a flow chart illustrating a processing operation of the protector for the electricity supply circuit according to the embodiment.

Next, the operation of transferring the controller 12 into the sleep mode after the load RL is turned off will be described with reference to a flow chart illustrated in FIG. 2 and a timing chart illustrated in FIG. 3. This process is executed by the timer control unit 22 and the sleep control unit 23.

First, in step S11, the timer control unit 22 judges whether or not the switch input signal outputted from the input determination control unit 21 is a signal representing the OFF command. That is, it is executed to judge whether or not the OFF command signal is inputted to the terminal N1 since the operation switch SW1 has been turned off. Then, if the OFF command is inputted (YES in step S11), the routine goes to step S12. While, if the OFF command is not inputted (NO in step S11), the routine goes to step S15.

In step S15, the timer control unit 22 clears the timer, and thereafter the routine is ended. That is, when the operation switch SW1 is turned on, the timer is cleared since there is no need of transferring to the sleep mode, and thereafter the routine is ended.

In step S12, the timer control unit 22 activates the timer to count the elapsed time since the OFF command signal is inputted.

In step S13, the timer control unit 22 judges whether or not the elapsed time counted by the timer amounts to a preset predetermined time. Additionally, whether or not the lower limit threshold determination unit 27 outputs a lower-limit determination signal representing that the estimated temperature of the power line estimated by the temperature estimation unit 24 has dropped the preset lower limit threshold is judged. If the predetermined time has passed and the lower-limit determination signal is outputted (YES in step S13), the routine goes to step S14.

If the predetermined time has not passed yet or if the lower-limit determination signal is not outputted (case that the estimated temperature of the power line does not drop below the lower limit threshold), the routine is ended.

In step S14, the sleep control unit 23 transfers the operation of whole of the controller 12 to the sleep mode. Consequently, the power consumption of the controller 12 as a whole is reduced. As a result, it is possible to reduce the burden of the battery installed on a vehicle and also possible to prevent the battery from being exhausted.

Next, the operation of the timer and the change in temperature of the power line after the operation switch is turned off will be described with reference to the timing chart illustrated in FIG. 3.

Figure 3:
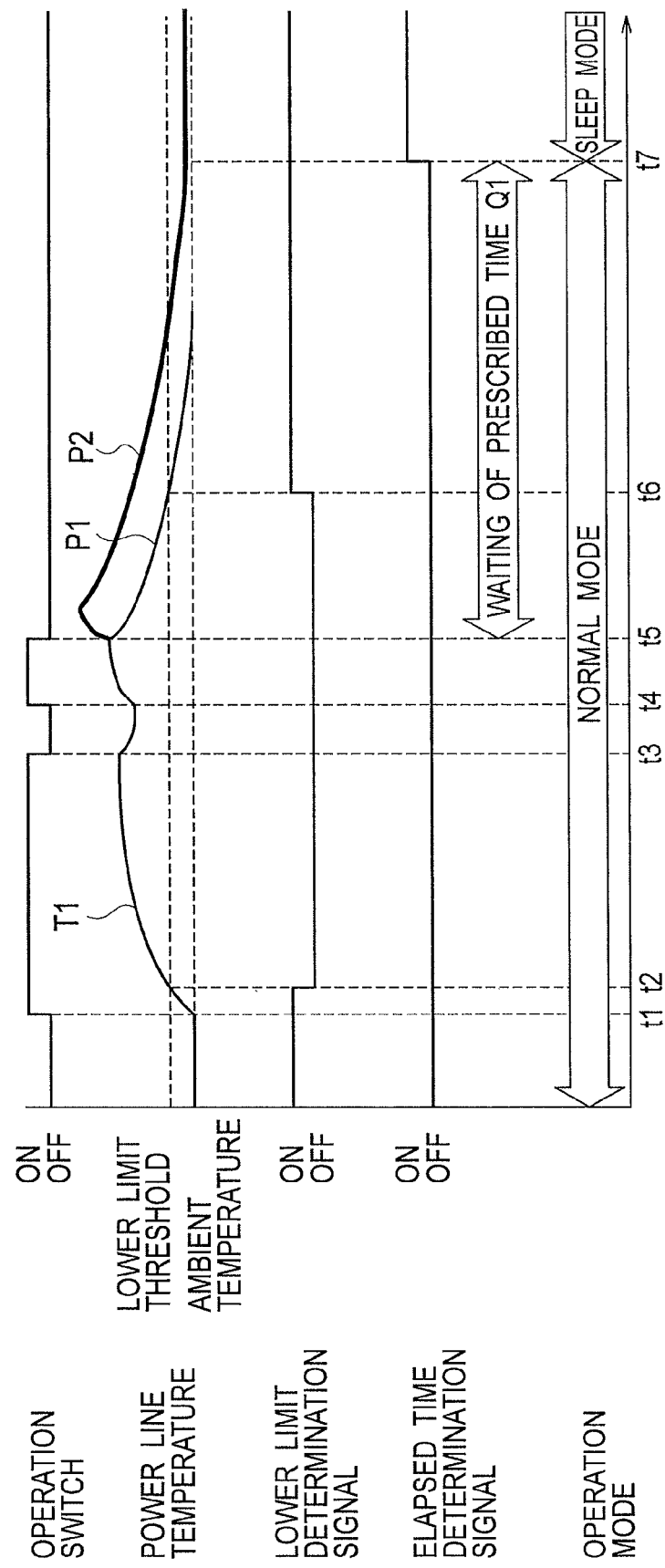
FIG. 3 is a timing chart illustrating the change of respective signals of the protector for the electricity supply circuit according to the embodiment.

First, when the operation switch SW1 is turned on at time t1 in FIG. 3, the switch input signal representing the ON command is inputted to the controller 12. Thus, the semiconductor switch circuit 11 is turned on, so that current flows to the power line of the electricity supply circuit, causing the driving of the load RL to be started. Then, the temperature T1 of the power line starts to rise gradually and exceeds the lower limit threshold at time t2. The result is that the lower limit determination signal outputted from the lower limit threshold determination unit 27 is switched from ON to OFF.

When the operation switch SW1 is turned off at time t3, the timer control unit 22 activates the timer to count the elapsed time since the operation switch SW1 is turned off. Then, the estimated temperature of the power line drops gradually, as illustrated with a curve T1. Thereafter, when the operation switch SW1 is again turned on at time t4, the timer is cleared. Additionally, the estimated temperature of the power line changes from its dropping to the rising.

Subsequently, if the operation switch SW1 is turned off at time t5, then the estimated temperature of the power line starts to drop as illustrated with a curve P1 and time measurement is started by the timer. Thereafter, when the estimated temperature drops below the lower limit threshold at time t6, the lower limit determination signal is outputted from the lower limit threshold determination unit 27 (ON).

At this point, as the timer has not counted the predetermined time Q1 yet, the operation is not transferred to the sleep mode. In other words, as the condition in step S13 of FIG. 2 is not satisfied, the operation is not transferred to the sleep mode.

As an elapsed time determination signal is outputted (ON) as a result that the time counted by the timer reaches the predetermined time Q1 at time t7, the sleep control unit 23 switches the operation mode of the controller 12 from the normal mode to the sleep mode. In other words, as the condition in step S13 of FIG. 2 is satisfied, the operation is transferred to the sleep mode by the processing in step S14.

That is, when the timer counts the prescribed time Q1 and the estimated temperature of the power line drops below the lower limit threshold, the operation of the controller 11 is transferred from the normal mode to the sleep mode. Thus, as the operation is transferred to the sleep mode after the temperature of the power line reached the ambient temperature surely, it becomes possible to appropriately control ON/OFF states of the semiconductor switch circuit 11, based on the temperature of the power line.

Further, as the forced air cooling operation is stopped when the operation switch SW1 is turned off, there is a possibility that high-temperature air is accumulated in an engine room. The result is that the power line is heated due to this high-temperature air and the power line temperature rises when turning off the semiconductor switch circuit 11, for example, as illustrated with a curve P2 of FIG. 3. For this reason, the actual power line temperature gets higher than the estimated temperature estimated by the temperature estimation unit 24 (i.e. temperature illustrated with P1), and even if the estimated temperature (P1) drops to the lower limit threshold, the actual temperature (P2) remains temperature higher than the ambient temperature. At this time, if the operation is transferred to the sleep mode based on the judgment that the estimated temperature (P1) has dropped below the lower limit threshold, the controller 12 would be transferred to the sleep mode despite that the power line temperature remains higher and therefore, it would be impossible to control the semiconductor switch circuit 11 properly.

In the protector for the electricity supply circuit according to the embodiment, when the estimated temperature of the power line has dropped below the lower limit threshold and additionally, the prescribed time (time Q1 illustrated in FIG. 3) has passed after the operation switch SW1 was turned off, the operation of the controller 12 is transferred into the sleep mode. Therefore, it becomes possible to transfer the operation to the sleep mode after the power line temperature was steadily lowered to around the ambient temperature.

In the protector for the electricity supply circuit according to the embodiment, this way, the operation of the controller 12 is transferred from the normal mode to the sleep mode after the prescribed time (Q1) has passed since the load RL, such as lamp and motor, installed on the vehicle is turned off, and additionally, after the estimated temperature of the power line has dropped below the lower limit threshold. Therefore, even when there is caused an error in the estimated temperature of the power line estimated by the temperature estimation unit 24, it is possible to control ON/OFF states of the semiconductor switch circuit 11 appropriately since the controller 12 is transferred into the sleep mode under condition that the power line temperature is lowered certainly (for example, condition where the power line temperature is lowered to the ambient temperature).

Although the protector for the electricity supply circuit according to the embodiment of the present invention has been described with reference to the accompanying drawings hereinbefore, the present invention is not limited to this embodiment only and therefore, the constitution of each part may be replaced with any given constitution.

What is claimed is:
1. A protector for an electricity supply circuit including a power line, the protector installed on a vehicle to monitor a temperature of the power line connected to a load and configured to disconnect the electricity supply circuit when the temperature of the power line exceeds a preset threshold temperature, the protector comprising:
a power switch configured to switch between connection and disconnection of the electricity supply circuit to the load;
a controller configured to output a switching command signal to the power switch in accordance with an input signal from an operation switch; and
a current detector configured to detect current flowing to the power line,
wherein the controller comprises:
a temperature estimation unit configured to estimate temperature increase of the power line based on the current detected by the current detector and conducting time when the electricity supply circuit is connected to the load, estimate temperature decrease of the power line based on an elapsed time when the electricity supply circuit is disconnected from the load by the controller, and estimate a temperature of the power line based on the temperature increase and the temperature decrease;
a timer configured to count an elapsed time after the disconnection of the electricity supply circuit from the load by the power switch;
a lower limit threshold determination unit configured to determine that the estimated temperature of the power line estimated by the temperature estimation unit has dropped below a predetermined temperature determined by an ambient temperature of the power line; and
a mode switching unit configured to switch the controller to a low power consumption mode in which power consumption of the controller is lower than the power consumption in a normal operation mode of the controller, in response to the elapsed time counted by the timer being greater than a predetermined time and the lower limit threshold determination unit determining that the estimated temperature of the power line estimated by the temperature estimation unit drops below the predetermined temperature, wherein
at least a part of the power line is heated by high temperature air from an engine in an engine room of the vehicle, and
the predetermined time is determined based on the temperature increase of the power line by the high temperature air when forced air cooling operation of the engine room is stopped during the disconnection of the power switch.
2. The protector for the electricity supply circuit according to claim 1, wherein
the temperature estimation unit does not estimate the temperature of the electricity supply circuit when the operation is switched to the low power consumption mode by the mode switching unit.

3. The protector for the electricity supply circuit according to claim 1, wherein the mode switching unit switches the controller to the low power consumption mode in response to the elapsed time being greater than the predetermined time and the estimated temperature of the electricity supply circuit being lower than the predetermined temperature occurring at a same time.

\* \* \* \* \*